US006588286B1

(12) United States Patent
Kudo et al.

(10) Patent No.: US 6,588,286 B1

(45) Date of Patent: Jul. 8, 2003

(54) NOFOAM SYSTEM FOR TESTING A FOAM DELIVERY SYSTEM ON A VEHICLE

(75) Inventors: Rance Tetsuo Kudo, Oxnard, CA (US); Raymond John Cappillino, Oxnard, CA (US); Jesse Lynn McNolty, Santa Paula, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/209,265

(22) Filed: Jul. 30, 2002

(51) Int. Cl.[7] .......................... G01F 1/05; A62C 35/00

(52) U.S. Cl. .................................... 73/861.79; 169/15

(58) Field of Search .................. 73/861.79; 169/54–70, 169/5–18

(56) References Cited

U.S. PATENT DOCUMENTS

| | | | | |
|---|---|---|---|---|
| 4,979,571 A | * | 12/1990 | MacDonald | 169/44 |
| 5,881,818 A | * | 3/1999 | Lee et al. | 169/15 |
| 6,357,532 B1 | * | 3/2002 | Laskaris et al. | 169/43 |

* cited by examiner

*Primary Examiner*—Edward Lefkowitz
*Assistant Examiner*—Takisha S Miller
(74) *Attorney, Agent, or Firm*—David Kalmbaugh

(57) ABSTRACT

A NoFoam system which permits the testing of the Aircraft Rescue and Fire Fighting vehicle's foam delivery system. The NoFoam system includes the piping, valves, and connecting elements to interface with the fire vehicle's foam delivery system, while minimizing the release of Aqueous Film Forming Foam (AFFF) to the environment.

20 Claims, 6 Drawing Sheets

NOFOAM SYSTEM FOR TESTING A FOAM DELIVERY SYSTEM ON A VEHICLE

BACKGROUND OF THE INVENTION

1. Field of the Invention

The present invent on relates generally to fire fighting systems for use in fighting and extinguishing hydrocarbon and other flammable liquid fires. More particularly, the present invention relates to a foam free test system for the environmentally safe testing the foam delivery systems used on Aircraft Rescue and Fire Fighting (ARFF) vehicles.

2. Description of the Prior Art

Currently, fire fighting guidelines and policies require quarterly and annual Aqueous Film Forming Foam (AFFF) discharge tests on all Aircraft Rescue and Fire Fighting (ARFF) vehicles. The foam discharge test verifies that the on-board foam delivery system is functioning properly, thereby ensuring a vehicle's fire fighting equipment is operational when called upon to save lives and property.

The method presently in use for determining fire fighting vehicle performance in the field is to discharge foam through each of the vehicle's nozzles and then collect foam samples in accordance with the National Fire Protection Association (NFPA) 412 Standard for Evaluating Aircraft; Rescue and Fire Fighting Foam Equipment. Each vehicle is equipped with at least two and up to five different types of nozzles, depending on the vehicle type. This procedure generates large amounts of AFFF wastewater. Depending on the type of vehicle, the generated AFFF wastewater volume may be anywhere from 850 gallons to more than 2,600 gallons per vehicle for each 30-second nozzle foam discharge test. This includes flushing the system with water as required under the guidelines of NFPA 412. At present, the Department of Defense (DOD) agencies have more than 1,200 ARFF vehicles in the fire fighting arsenal inventory at more than 240 activities. The net result is the testing of fire fighting vehicles generates a substantial amount of AFFF wastewater annually.

Fire fighting personnel often conduct routine daily, weekly or monthly AFFF discharge testing, in addition to the mandated requirements, due to low confidence in the performance of the fire fighting vehicle's foam delivery system. The routine testing is a visual check of foam being emitted through the various nozzles of the vehicle. It is estimated that a minimum of 5 seconds is required for the fire fighter to verify that foam is being emitted through a single nozzle. Depending on the type of vehicle, these 5 second routine checks, with system flush, generates 500 to 1,500 gallons of AFFF wastewater per ARFF vehicle. These routine foam delivery system tests generate significant amounts of AFFF wastewater, which result in environmental damage.

Despite its wide use and effectiveness for fire fighting, AFFF poses an environmental problem because of its resistance to biodegradation, its toxicity due to constituents butyl carbitol (a glycol ether) and perfluorooctyl sulfonates (PFOS), its high biochemical oxygen demand (BOD), and its chemical oxygen demand (COD).

In addition to the environmental concerns with respect to AFFF wastewater discharges into the environment, the significant foaming capacity of AFFF makes the recovery and treatment of spent AFFF very difficult. In some regions, the military is no longer allowed to discharge AFFF wastewater to industrial waste treatment plant facilities because of subsequent treatment plant fouling and damage. Hence, when disposing of AFFF wastewater, the military incurs additional cost associated with hazardous waste handling, collection, disposal, and issues relating to liability for environmental and other damage.

SUMMARY OF THE INVENTION

The NoFoam system for testing the foam delivery system on a fire fighting vehicle comprises a control panel having a flow meter, flow sensor piping and valves, and a holding tank for the surrogate fluid mounted on a portable trailer/stationary-pad. The fire fighter simply drives the vehicle to be tested to the .mobile/stationary pad NoFoam system and connects to the delivery system's fluid supply line. At this point, the user continues through the fire fighting foam discharge procedures. A flow meter installed in the NoFoam system senses the flow rate of the surrogate fluid and allows the user to read a display for the flow meter. The firefighter simply reads the monitor and quickly determines the vehicle's foam delivery system performance. The flow that is monitored represents the flow rate of the AFFF concentrate into the vehicle's AFFF delivery system. The use of a dye-water solution allows the user to visually inspect the vehicle's performance, although the NoFoam system still performs adequately without the dye concentrate. The dye concentrate selected is an environmentally benign, biodegradable dye, certified by the National Sanitation Foundation (NSF) International to NSF Standard 60 for the use in potable water (Drinking Water Treatment Chemicals Health Effects), and DOD adopted industry standard issued by the American National Standard Institute.

DETAILED DESCRIPTION OF A PREFERRED EMBODIMENT

Figure 1:
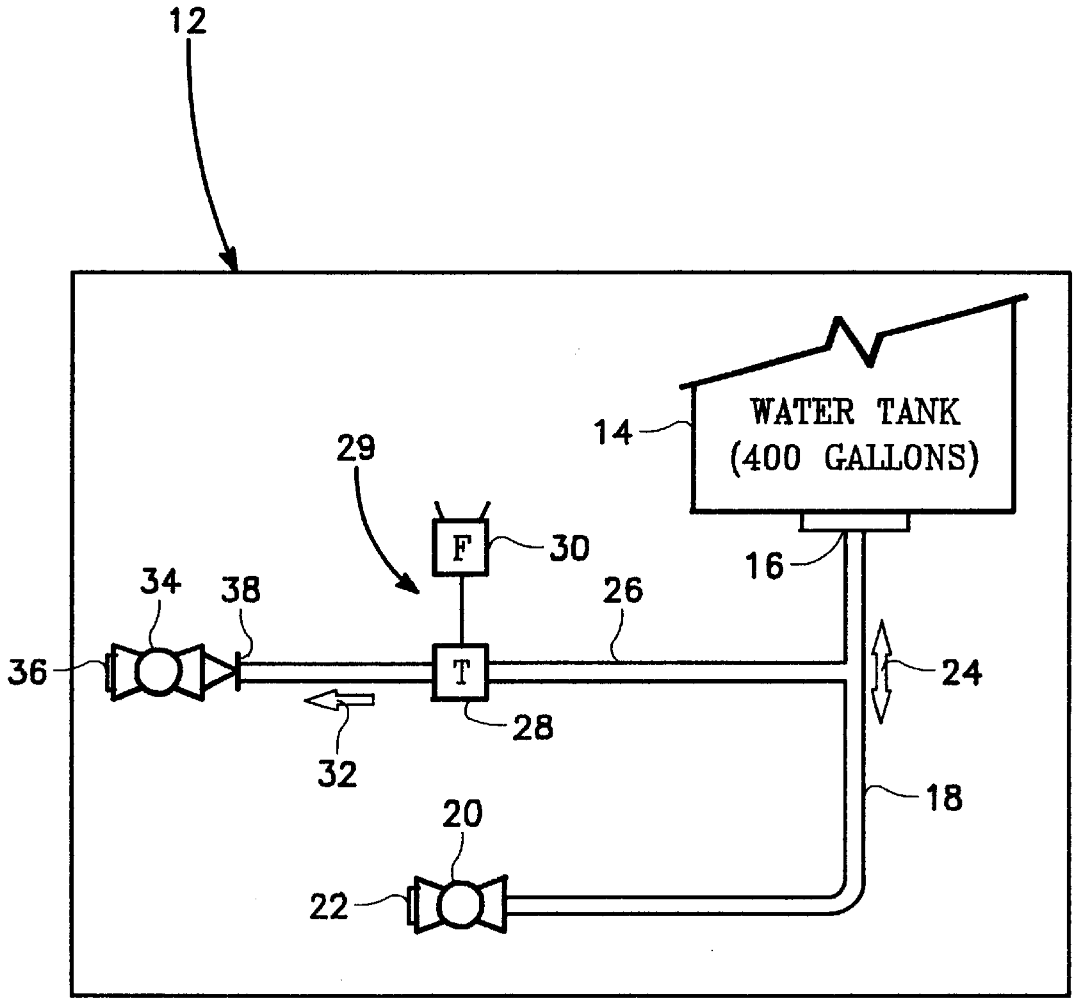
FIGS. 1 and 2 illustrate a detailed fluid flow schematic diagram of the NoFoam system for the testing of a foam delivery system on a P300 fire fighting vehicle.
Figure 2:
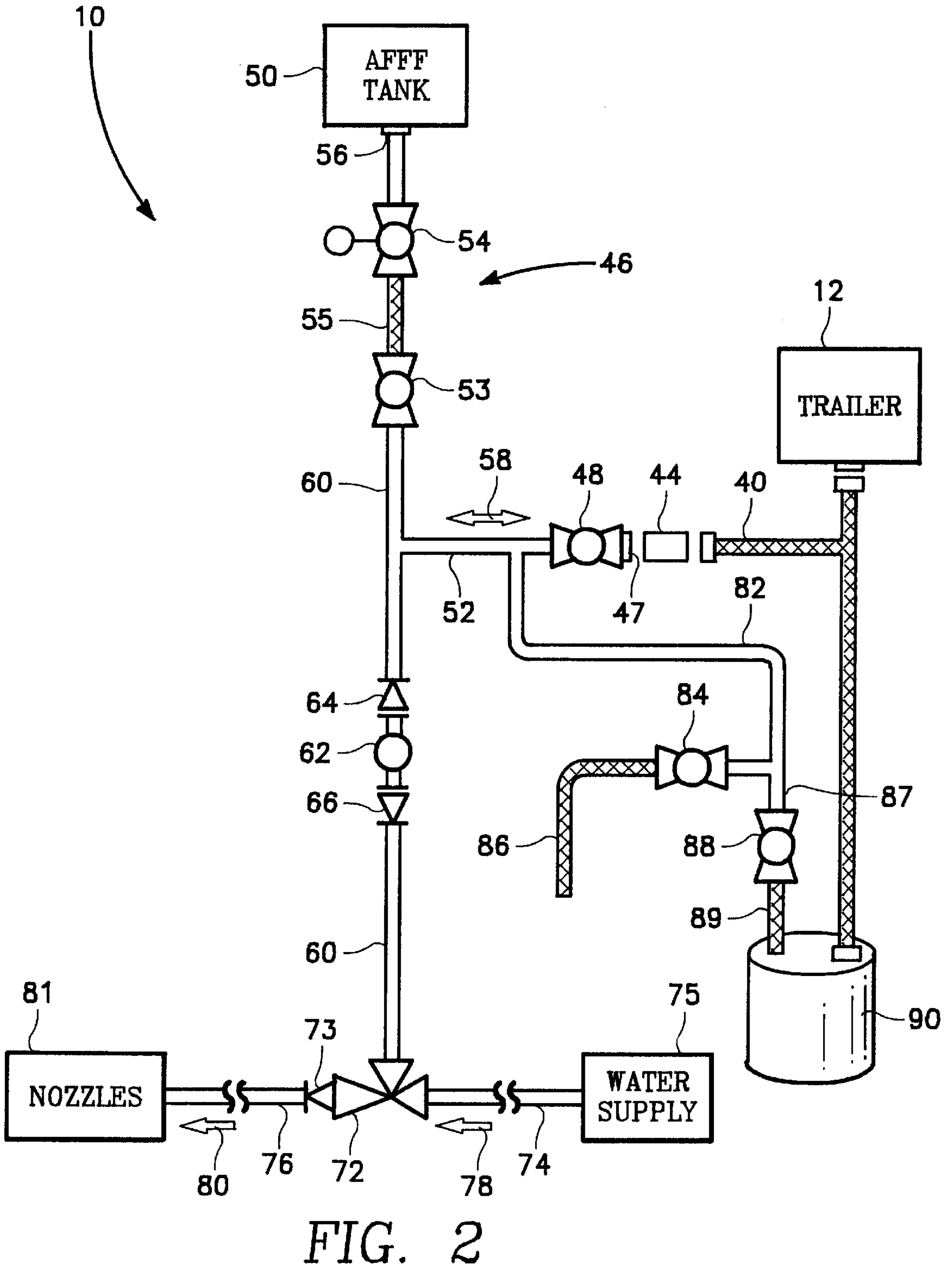

Referring to FIGS. 1 and 2, the NoFoam system, designated generally by the reference numeral 10, permits the testing of the Aircraft Rescue and Fire Fighting (ARFF) vehicle's foam delivery system, which includes the delivery system's piping, valves, pump, proportioner, eductor, and nozzles, while minimizing the release of Aqueous Film Forming Foam (AFFF) to the environment. An environmentally benign surrogate fluid is used for testing enabling a user to validate the readiness of the vehicle's fire fighting equipment. NoFoam system complies with the NFPA 414 Standard for Aircraft Rescue and Fire Fighting Vehicles, which allows for the use of dye-water in Foam Distribution System Pump Testing and Flushing System Testing of ARFF vehicles.

The NoFoam system 10 includes a trailer stationary-pad 12 which allows the user to transport the system to a location at a facility where fire fighting vehicles are normally tested. Trailer stationary-pad 12 has a 400 gallon water tank 14 mounted thereon. The water tank 14 is filled with approximately 400 gallons of water to test the fire fighting vehicle's foam delivery system. A fluorescent yellow/green dye or any other color dye is then. Addends to the water which results in a highly visible dye-water flowing from the water tank 14. The color of the dye added depends upon user requirements.

The water tank 14 includes an opening or discharge port 16 at its bottom end. A 2 inch IPS (Iron Pipe Size) pipe 18 connects the opening 16 at the bottom of tank 14 to a first inlet/outlet port of a 2 inch IPS ball valve 20 which is manually opened and closed by a user of system 10. The second inlet/outlet port of ball valve includes a 2½ inch IPS water fill and drain connector 22 which allows the user to connect an external water source to ball valve 20 to fill tank 14. The user can also connect a drain hose to ball valve 20 to drain tank 14. Arrow 24 indicates that fluid flow through pipe 18 can be in either direction.

Branching at angle of approximately 90° from pipe 18 is. a 1¼ inch IPS pipe 26 which includes the paddle wheel flow transmitter 28 of a fluid flow sensor 29. A flow indicator 30 for sensor 29, which is electrically connected to transmitter 28, allows the user to observe the flow rate of dye-water from tank 14. The direction of dye-water flow through the fluid flow meter is indicated by arrow 32. The open end of pipe 26 is connected to a 1½ inch IPS ball valve 34 by a 1½ inch IPS×1¼ inch IPS reducer 38.

Valve 34 includes a hose connector 36 at its outlet port. One end of a flexible hose 40 is connected to the hose connector 36 for valve 34. The other end of flexible hose 40 is connected to the hose connector 47 for a ball valve 48 by a hose connector fitting 44 for the foam delivery system 46 currently being tested. When AFFF concentrate is being drained from foam delivery system 46 flexible hose is disconnected from the hose connector 36 for valve 34. Flexible hose terminates is then positioned above a 5½ gallon polyethylene storage tank 90 allowing AFFF concentrate to drain into storage tank 90.

A 1½ inch IPS pipe 52 connects ball valve 48 to the AFFF concentrate's flow line pipe 60 which is a 2 inch IPS pipe. One end of pipe is thereof connected to the outlet port for a 2 inch IPS ball valve 53. A flexible hose 55 connects the inlet port of ball valve 53 to a ball valve with pneumatic operator 54 for AFFF concentrate tank 50. Tank 50 which is the storage tank for AFFF concentrate on the fire fighting vehicle has at its bottom end an opening or discharge port 56 through which AFFF concentrate flows when ball valves 53 and 54 are open. An arrow 58 indicates that fluid flow through pipe 52 is in both directions.

The 2 inch IPS pipe 60 has in its fluid flow path a ball valve 53, and a multi-metering manifold valve 62. Multi-metering manifold valve 62 includes a 2½ inch IPS×2 inch IPS reducer 64 at its inlet port and a 2½ inch IPS×2 inch IPS reducer 66 at its discharge port. The direction of fluid flow through pipe 60 is indicated by arrow 70.

Connected to the opposite end of pipe 60 is the first inlet port of eductor 72. A 2 inch IPS water supply line 74 supplies water from a water supply tank 75 through a water pump (not illustrated) to the eductor 72 which converts pressure to kinetic energy, creating a vacuum that sucks the AFFF concentrate/surrogate fluid into the eductor 72. The eductor 72 mixes the AFFF concentrate/surrogate fluid with the pressurized water discharging the mixture through the discharge port of eductor 72 into a 2 inch IPS pipe 76. Pipe 76 connects the discharge port of educator 72 to the nozzles 81 for the fire fighting vehicle. The flow direction for the pressurized water supplied to eductor 72 is indicated by arrow 78, while the flow direction for the resulting water AFFF concentrate/surrogate fluid mixture is indicated by arrow 80.

One end of 1½ inch IPS pipe 82 branches from pipe 52, while the other end is connected to a ball/drain valve 84. The discharge port of ball valve 84 is connected to a manifold valve (not illustrated) by a flexible hose 86. A branch 1½ inch IPS pipe 87 connects pipe 82 to a ball valve 87. Ball/drain valve 88 has one end of a flexible hose 89 connected to its discharge port. The other end of flexible hose 89 terminates in 5½ gallon polyethylene storage tank 90. Opening ball valve 88 allows residual AFFF concentrate to drain into storage tank 90.

Multi-metering manifold valve 62 allows for multiple flow rates of AFFF concentrate, water or fluorescent yellow/green dye-water or any other color dye through the valve. When the user desires to test (for a 3% AFFF concentrate) the roof turret nozzle on the fire fighting vehicle at the high flow rate, the manifold valve 62 is set such that the water flow rate is 1500 GPM which equates to flow rate of 45 GPM of AFFF concentrate through the valve 62. When the user desires to test (for a 3% AFFF concentrate) the roof turret nozzle at the low flow rate, the manifold valve 62 is set such that the water flow rate is 750 GPM which equates to flow rate of 22.5 GPM of AFFF concentrate through the valve 62.

Similarly, when the user desires to test (for a 3% AFFF concentrate) the bumper turret nozzle on the fire fighting vehicle, the manifold valve 62 is set such that the water flow rate is 300 GPM which equates to flow rate of 9.0 GPM of AFFF concentrate through the valve 62.

Further, when the user desires to test (for a 3% AFFF concentrate) the left handline nozzle of a pair of handline nozzles on the fire fighting vehicle, the manifold valve 62 is set such that the water flow rate is 90 GPM which equates to flow rate of 2.8 GPM of AFFF concentrate through the valve 62. When the user desires to test (for a 3% AFFF concentrate) the right handline nozzle of a pair of handline nozzles on the fire fighting vehicle, the manifold valve 62 is set such that the water flow rate is 90 GPM which equates to flow rate of 2.8 GPM of AFFF concentrate through the valve 62.

Figure 3:
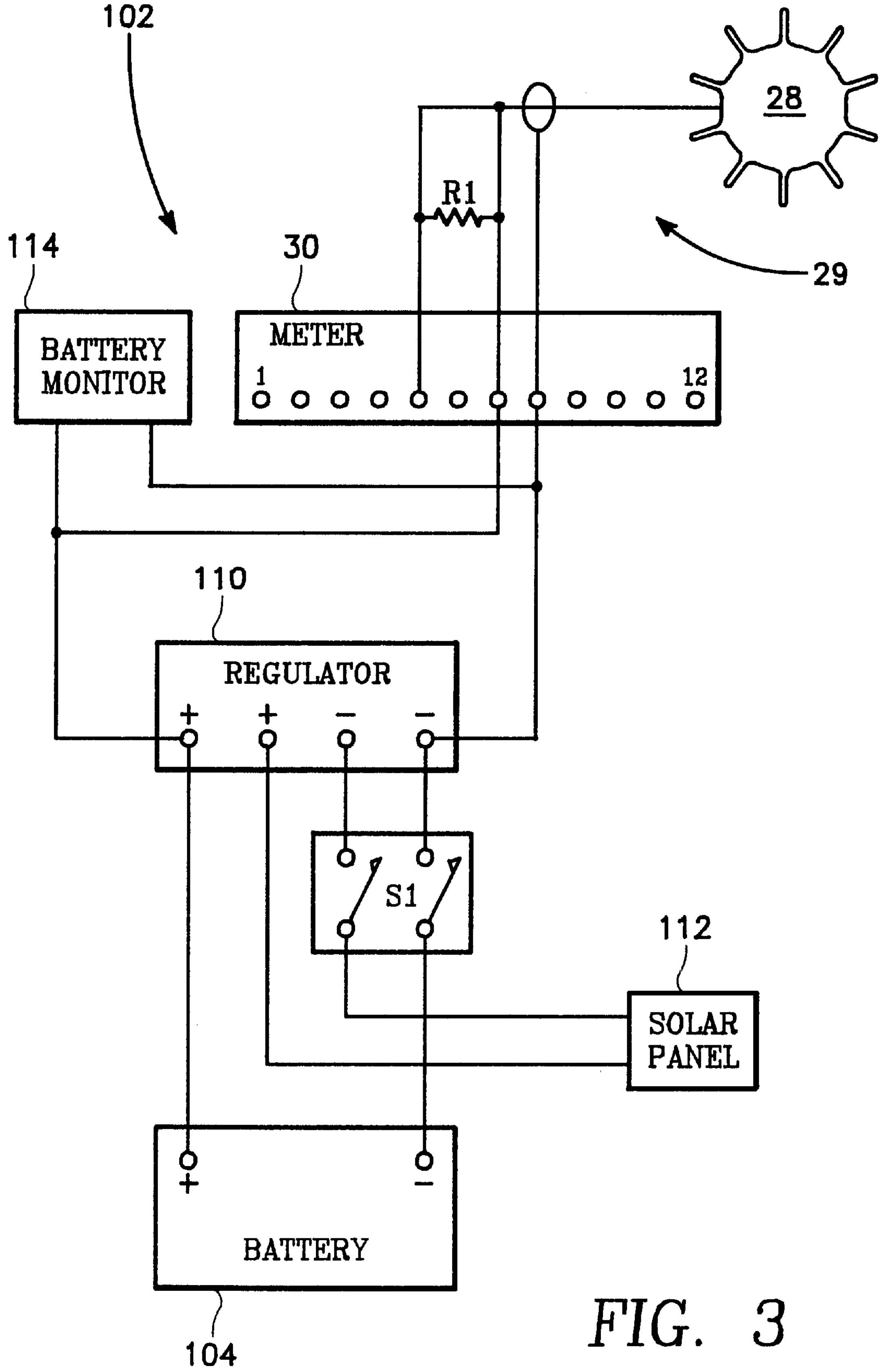
FIG. 3 illustrates a schematic diagram of the electrical circuit for the NoFoam system of FIGS. 1 and 2.

Referring to. FIG. 1, 2 and 3, there is shown in FIG. 3 the electrical control panel 102 for the NoFoam system 10 of FIGS. 1 and 2. Fluid flow meter 29 of FIG. 1 includes paddle wheel flow transmitter 28 which is electrically connected to the flow indicator/rate meter 30 for fluid flow meter 29. Paddle wheel flow transmitter 28 transmits a 4 to 20 ma (milliamp) signal that is read by rate meter 30. Rate meter 30 is a digital meter located on control panel 102. The control panel include a switch S1, a 12 Volt battery 104, and a voltage regulator 110. The positive terminal of the battery 104 is electrically connected to the positive terminal of the voltage regulator 110, while the negative terminal of the battery 104 is connected through switch S1 to the negative terminal of voltage regulator 110. There is a solar panel 112 mounted on control panel 102. The solar panel 112 is connected to the positive terminal of the voltage regulator 110 and is connected through switch S1 to the negative terminal of voltage regulator 110. Panel 102 also includes a battery monitor 114 for monitoring battery output voltage. Battery monitor 114 is connected to the positive and negative terminals of voltage regulator 110. Resistor R1 is a 10 K-ohm resistor.

Figure 4:
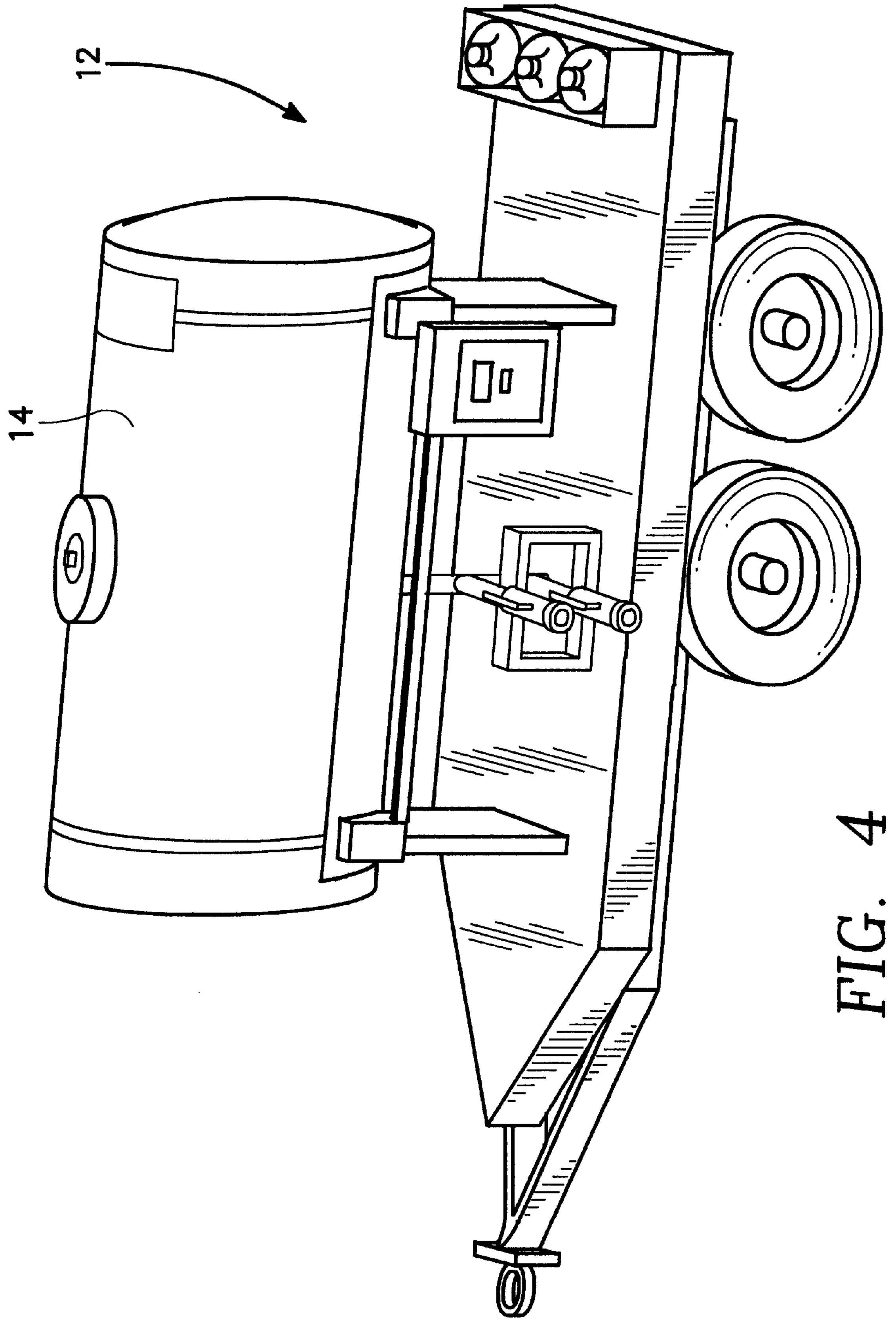
FIG. 4 illustrates the stationary pad/trailer and the 400 gallon water tank mounted thereon for the NoFoam System of FIGS. 1 and 2.
Figure 5:
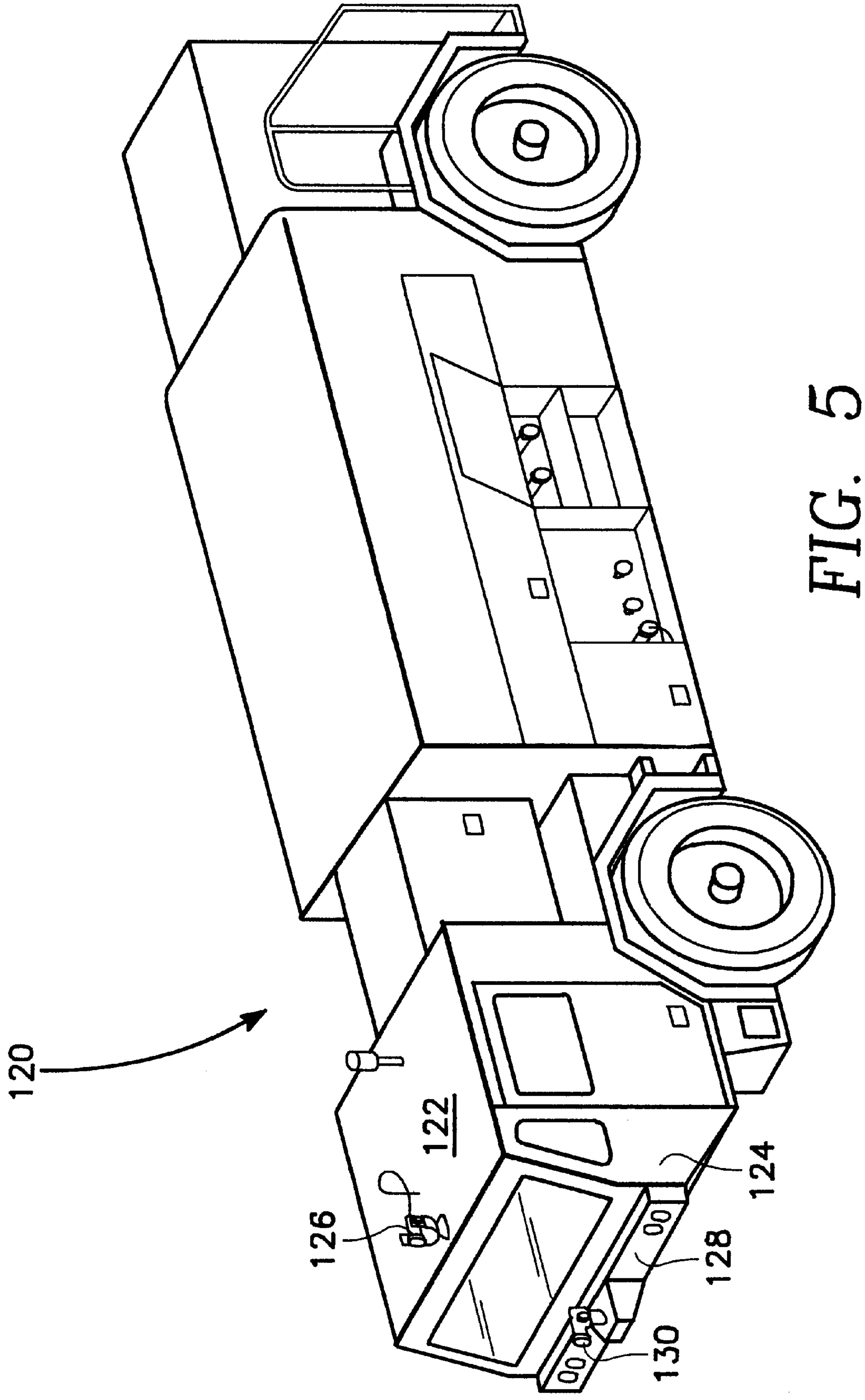
FIG. 5 illustrates the P300 fire fighting vehicle.
Figure 6:
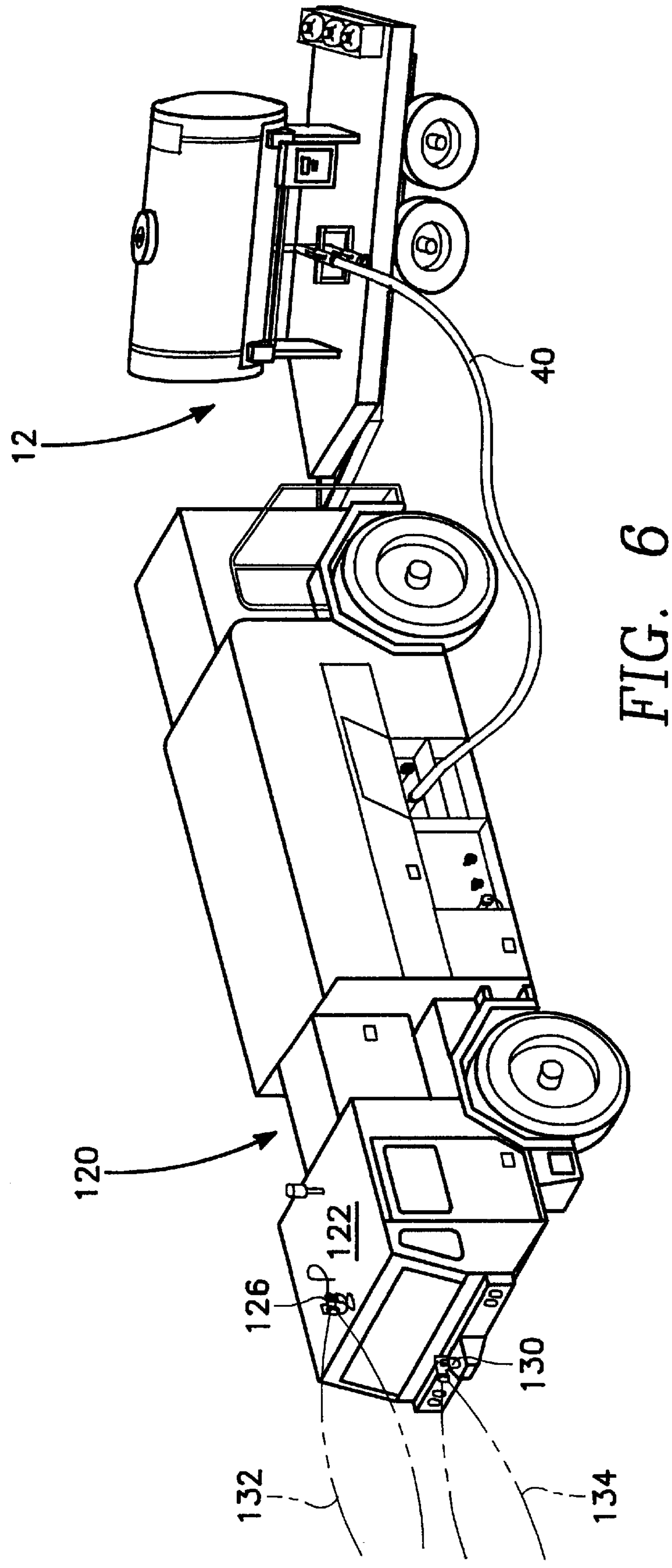
FIG. 6 illustrates the operation of the NoFoam system during a test of the P300 fire fighting vehicle's foam delivery system.

Referring to FIGS. 4, 5 and 6, FIG. 4 illustrates the stationary pad/trailer 12 and the 400 gallon water tank 14 mounted on the stationary pad/trailer 12 for the NoFoam System 10 depicted in FIGS. 1 and 2. FIG. 5 illustrates the P300 fire fighting vehicle, which is designated generally by the reference numeral 120. FIG. 6 illustrates the operation of the NoFoam system 10 during a test of the P300 fire fighting vehicle's foam delivery system 46. Positioned on the roof 122 of the driver's compartment 124 is the roof turret nozzle 126 for the fire fighting vehicle 120. Similarly, there is positioned on the front bumper 128 the bumper nozzle 130 for the fire fighting vehicle 120. When the foam delivery system 46 for fire fighting vehicle 120 is being tested a dye-water solution discharge/spray 132 is generated by turret nozzle 126 and dye-water solution discharge/spray 134 is generated by bumper nozzle 130. The sprays 132 and 134, which are yellow/green or another color, allow the user to visually inspect the operation of the foam delivery system 46, giving the firefighter confidence in the fire fighting vehicle's performance.

Referring to FIGS. 1, 2 and 3, the user when operating the NoFoam system 10 utilizes the following procedure with respect to trailer/stationary-pad 12. The user first closes ball valve 34 and then fills 400 gallon water tank 14. In the alternative ball valve 20 could be open and the tank filled through ball valve 20. The user adds the fluorescent yellow/green dye or any other color dye to the water and turns on the electrical panel 102 by closing switch S1.

With respect to the fire fighting vehicle and its fire fighting vehicle's foam delivery system 46, the user turns off the fire fighting vehicle and insures that the vehicle's air tanks are at their capacity of 120 PSI. The user attaches flexible 40 to the hose connector 47 for ball valve 48 using hose connector fitting 44.

The user next closes ball valve 84, opens drain valve 88 and opens drain valve 48, which allows the AFFF concentrate in the AFFF delivery system 46 to drain through valves 48 and 88 into polyethylene storage tank 90. The user closes drain valve 88 and ball valve 53 after the user completely drain AFFF concentrate from foam delivery system 46.

Draining the AFFF concentrate from delivery system 46 generally results in an accumulation of about 1½ gallons of AFFF concentrate into storage tank 90.

The user next attaches the other end of flexible hose 40 to the hose connector 36 for ball valve 34. Finally, the user opens 1½ inch IPS ball valve 34, and is ready to begin the nozzle discharge test.

To start the nozzle discharge test for the fire fighting vehicle the user starts the vehicle, goes through normal foam delivery discharge tests and sets the agent selector valve for the fire fighting vehicle to the "FOAM" position. The user next opens the station nozzle valve for the roof nozzle (high and low flow rates), bumper nozzle, left and right handline nozzle or any combination thereof to be tested. The user reads the flow indicator/rate meter 30 for fluid flow meter 29, a water pressure pump gage-which indicates water pressure of the foam delivery system 46 and the elapsed time. This information allows the user to determine the effectiveness of the foam delivery system 46 for the fire fighting vehicle.

From the foregoing, it is readily apparent that the present invention comprises a new, unique, and exceedingly useful NoFoam system for testing an aqueous film forming foam delivery system on a fire fighting vehicle which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A foam free system which provides for an environmentally safe testing of a foam delivery system on a fire fighting vehicle, comprising:

a mobile platform adapted for movement to a location having said fire fighting vehicle;

a surrogate fluid storage tank mounted on said mobile platform, said surrogate fluid storage tank containing an environmentally safe surrogate fluid, said surrogate fluid storage tank having an inlet/outlet port;

a flow sensor located on said mobile platform, said flow sensor including a paddle wheel flow transmitter connected to the inlet/outlet port of said surrogate fluid storage tank and a flow indicator electrically connected to said paddle wheel flow transmitter, said flow indicator providing a measurement of a fluid flow rate of said surrogate fluid through the paddle wheel flow transmitter of said flow sensor;

a first ball valve located on said mobile platform, said first ball valve having an inlet port connected to the paddle wheel flow transmitter of said flow sensor and an outlet port;

a flexible hose having one end connected to the outlet port of said first ball valve;

a second ball valve located on said fire fighting vehicle, said second ball valve having an inlet port connected to the other end of said flexible hose and an outlet port, said first ball valve and said second ball valve being open when said foam free system is testing the foam delivery system on said fire fighting vehicle, said first ball valve and said second ball valve when open allowing said surrogate fluid to flow through said first ball valve and said second ball valve;

a multi-metering manifold valve located on said fire fighting vehicle, said multi-metering manifold valve having an inlet port connected to the outlet port of said second ball valve and a discharge port, said multi-metering manifold valve controlling a flow rate of said surrogate fluid through said multi-metering manifold valve;

a first reducer and a second reducer, said first reducer being affixed to the inlet port of said multi-metering manifold valve and said second reducer being affixed to the outlet port of said multi-metering manifold valve;

a supply tank for providing an environmentally safe pressurized liquid, said supply tank having an outlet port;

an eductor located on said fire fighting vehicle, said eductor having a first inlet port connected to the outlet port of said supply tank, a second inlet port connected to the discharge port of said multi-metering manifold valve, said eductor receiving said pressurized liquid from said supply tank, said pressurized liquid creating a vacuum within said eductor that draws said surrogate fluid into said eductor, said eductor mixing said surrogate fluid with said pressurized water to form a surrogate fluid mixture under pressure discharging said surrogate fluid mixture through the discharge port of said eductor; and a third reducer affixed to the discharge port of said eductor.

2. The foam free system of claim 1 wherein said surrogate fluid mixture comprises a fluorescent yellow green dye which is an environmentally benign, biodegradable dye.

3. The foam free system of claim 1 further comprising:

a battery having a positive terminal and a negative terminal;

a solar panel having an output;

a normally open switch having a first terminal connected to the negative terminal of said battery and the output of said solar panel and a second terminal;

a voltage regulator having a positive terminal connected to the positive terminal of said battery and a negative terminal connected to the second terminal of said voltage regulator and the flow indicator of said flow sensor; and a battery monitor connected to the positive terminal and the negative terminal of said voltage regulator.

4. The foam free system of claim 1 wherein the flow rate of said surrogate fluid through said multi-metering manifold valve is between about 2.8 GPM and 45 GPM, the flow rate of said surrogate fluid through said multi-metering manifold valve being set at approximately 45 GPM or 22.5 GPM when a user is testing a roof turret nozzle on said fire fighting vehicle, the flow rate of said surrogate fluid through said multi-metering manifold valve being set at approximately 9.0 GPM when a user is testing a bumper turret nozzle on said fire fighting vehicle, and the flow rate of said surrogate fluid through said multi-metering valve being set at approximately 2.8 GPM when the user is testing a left handline nozzle and a right handline nozzle on said fire fighting vehicle.

5. The foam free system of claim 1 wherein said surrogate fluid storage tank comprises a 400 gallon storage tank.

6. A foam free system which provides for an environmentally safe testing of a foam delivery system on a fire fighting vehicle, comprising:

a mobile platform adapted for movement to a location having said fire fighting vehicle;

a surrogate fluid storage tank mounted on said mobile platform, said surrogate fluid storage tank containing an environmentally safe surrogate fluid, said surrogate fluid storage tank having an outlet port;

a flow sensor located on said mobile platform, said flow sensor including a paddle wheel flow transmitter connected to the outlet port of said surrogate fluid storage tank and a flow indicator electrically connected to said paddle wheel flow transmitter, said flow indicator providing a measurement of a fluid flow rate of said surrogate fluid through the paddle wheel flow transmitter of said flow sensor;

a first ball valve located on said mobile platform, said first ball valve having an inlet port connected to the paddle wheel flow transmitter of said flow sensor and an outlet port;

a first flexible hose having a first end connected to the outlet port of said first ball valve;

a second ball valve located on said fire fighting vehicle, said second ball valve having a first inlet/outlet port connected to a second end of said first flexible hose and a second inlet/outlet port, said first ball valve and said second ball valve being open when said foam free system is testing the foam delivery system on said fire fighting vehicle, said first ball valve and said second ball valve when open allowing said surrogate fluid to flow through said first ball valve and said second ball valve;

a multi-metering manifold valve located on said fire fighting vehicle, said multi-metering manifold valve having an inlet port connected to the second inlet/outlet port of said second ball valve and a discharge port, said multi-metering manifold valve controlling a flow rate of said surrogate fluid through said multi-metering manifold valve;

a first reducer and a second reducer, said first reducer being affixed to the inlet port of said multi-metering manifold valve and said second reducer being affixed to the outlet port of said multi-metering manifold valve;

a supply tank for providing an environmentally safe pressurized liquid, said supply tank having an outlet port;

an eductor located on said fire fighting vehicle, said eductor having a first inlet port connected to the outlet port of said supply tank, a second inlet port connected to the discharge port of said multi-metering manifold valve, said eductor receiving said pressurized liquid from said supply tank, said pressurized liquid creating a vacuum within said eductor that draws said surrogate fluid into said eductor, said eductor mixing said surrogate fluid with said pressurized water to form a surrogate fluid mixture under pressure discharging said surrogate fluid mixture through the discharge port of said eductor;

a third reducer affixed to the discharge port of said eductor; and the second end of said first flexible hose being disconnected from the outlet port of said first ball valve prior to testing the foam delivery system on said fire fighting vehicle;

a primary concentrate storage tank positioned at the second end of said first flexible hose prior to testing the foam delivery system on said fire fighting vehicle, said primary concentrate storage tank receiving aqueous film forming foam concentrate drained from said foam delivery system prior to testing said foam delivery system, said second ball valve being open allowing said aqueous film forming foam concentrate drained from said foam delivery system to flow through said second ball valve and said first flexible hose into said primary concentrate storage tank.

7. The foam free system of claim 6 further comprising:

a third ball valve having an inlet port connected to said foam delivery system and an outlet port;

a second flexible hose having one end connected to the outlet port of said third ball valve and the other end positioned at said primary concentrate storage tank; and said primary concentrate storage tank receiving residual of said aqueous film forming foam concentrate passing through when said third ball valve is open.

8. The foam free system of claim 7 further comprising:

a fourth ball valve having an inlet port connected to said foam delivery system and an outlet port;

a third flexible hose having one end connected to the outlet port of said third ball valve; and said fourth ball valve being closed when said aqueous film forming foam concentrate is being drained from said foam delivery system.

9. The foam free system of claim 6 wherein said primary storage tank comprises a 5½ gallon polyethylene storage tank.

10. The foam free system of claim 6 wherein said surrogate fluid mixture comprises a fluorescent yellow green dye which is an environmentally benign, biodegradable dye.

11. The foam free system of claim 6 further comprising:

a battery having a positive terminal and a negative terminal;

a solar panel having an output;

a normally open switch having a first terminal connected to the negative terminal of said battery and the output of said solar panel and a second terminal;

a voltage regulator having a positive terminal connected to the positive terminal of said battery and a negative terminal connected to the second terminal of said voltage regulator and the flow indicator of said flow sensor; and a battery monitor connected to the positive terminal and the negative terminal of said voltage regulator.

12. The foam free system of claim 6 wherein the flow rate of said surrogate fluid through said multi-metering manifold valve is between about 2.8 GPM and 45 GPM, the flow rate of said surrogate fluid through said multi-metering manifold valve being set at approximately 45 GPM or 22.5 GPM when a user is testing a roof turret nozzle on said fire fighting vehicle, the flow rate of said surrogate fluid through said multi-metering manifold valve being set at approximately 9.0 GPM when a user is testing a bumper turret nozzle on said fire fighting vehicle, and the flow rate of said surrogate fluid through said multi-metering valve being set at approximately 2.8 GPM when the user is testing a left handline nozzle and a right handline nozzle on said fire fighting vehicle.

13. The foam free system of claim 6 wherein said surrogate fluid storage tank comprises a 400 gallon storage tank.

14. A foam free system which provides for an environmentally safe testing of a foam delivery system on a fire fighting vehicle, comprising:

a mobile platform adapted for movement to a location having said fire fighting vehicle;

a surrogate fluid storage tank mounted on said mobile platform, said surrogate fluid storage tank containing an environmentally safe surrogate fluid, said surrogate fluid storage tank having an inlet/outlet port;

a flow sensor located on said mobile platform, said flow sensor including a paddle wheel flow transmitter connected to the outlet port of said surrogate fluid storage tank and a flow indicator electrically connected to said paddle wheel flow transmitter, said flow indicator providing a measurement of a fluid flow rate of said surrogate fluid through the paddle wheel flow transmitter of said flow sensor;

a first ball valve located on said mobile platform, said first ball valve having an inlet port connected to the paddle wheel flow transmitter of said flow sensor and an outlet port;

a first flexible hose having a first end connected to the outlet port of said first ball valve;

a second ball valve located on said fire fighting vehicle, said second ball valve having a first inlet/outlet port connected to a second end of said first flexible hose and a second inlet/outlet port, said first ball valve and said second ball valve being open when said foam free system is testing the foam delivery system on said fire fighting vehicle, said first ball valve and said second ball valve when open allowing said. surrogate fluid to flow through said first ball valve and said second ball valve;

a multi-metering manifold valve located on said fire fighting vehicle, said multi-metering manifold valve having an inlet port connected to the second inlet/outlet port of said second ball valve and a discharge port, said multi-metering manifold valve controlling a flow rate of said surrogate fluid through said multi-metering manifold valve;

a first reducer and a second reducer, said first reducer being affixed to the inlet port of said multi-metering manifold valve and said second reducer being affixed to the outlet port of said multi-metering manifold valve;

a supply tank for providing an environmentally safe pressurized liquid, said supply tank having an outlet port;

an eductor located on said fire fighting vehicle, said eductor having a first inlet port connected to the outlet port of said supply tank, a second inlet port connected to the discharge port of said multi-metering manifold valve, said eductor receiving said pressurized liquid from said supply tank, said pressurized liquid creating a vacuum within said eductor that draws said surrogate. fluid into said eductor, said eductor mixing said surrogate fluid with said pressurized water to form a surrogate fluid mixture under pressure discharging said surrogate fluid mixture through the discharge port of said eductor;

a third reducer affixed to the discharge port of said eductor; and the second end of said first flexible hose being disconnected from the outlet port of said first ball valve prior to testing the foam delivery system on said fire fighting vehicle;

a primary concentrate storage tank positioned at the second end of said first flexible hose prior to testing the foam delivery system on said fire fighting vehicle, said primary concentrate storage tank receiving aqueous film forming foam concentrate drained from said foam delivery system prior to testing said foam delivery system, said second ball valve being open allowing said aqueous film forming foam concentrate drained from said foam delivery system to flow through said second ball valve and said first flexible hose into said primary concentrate storage tank;

a third ball valve located on said mobile platform, said third ball valve having an inlet/outlet port connected to the inlet/outlet port of said surrogate fluid storage tank and a drain/fill connector for receiving said surrogate fluid, said surrogate fluid passing through said third ball valve to said surrogate fluid storage tank filling said surrogate fluid storage tank with said surrogate fluid;

said third ball valve being closed during said environmentally safe testing of said foam delivery system.

15. The foam free system of claim 14 further comprising:

a fourth ball valve having an inlet port connected to said foam delivery system and an outlet port;

a second flexible hose having one end connected to the outlet port of said fourth ball valve and the other end positioned at said primary concentrate storage tank; and said primary concentrate storage tank receiving residual of said aqueous film forming foam concentrate passing through when said fourth ball valve is open.

16. The foam free system of claim 15 further comprising:

a fifth ball valve having an inlet port connected to said foam delivery system and an outlet port;

a third flexible hose having one end connected to the outlet port of said fifth ball valve; and said fifth ball valve being closed when said aqueous film forming foam concentrate is being drained from said foam delivery system.

17. The foam free system of claim 14 wherein said primary storage tank comprises a 5½ gallon polyethylene storage tank.

18. The foam free system of claim 14 wherein said surrogate fluid mixture comprises a fluorescent yellow green dye which is an environmentally benign, biodegradable dye.

19. The foam free system of claim 14 further comprising:

a battery having a positive terminal and a negative terminal;

a solar panel having an output;

a normally open switch having a first terminal connected to the negative terminal of said battery and the output of said solar panel and a second terminal;

a voltage regulator having a positive terminal connected to the positive terminal of said battery and a negative terminal connected to the second terminal of said voltage regulator and the flow indicator of said flow sensor; and a battery monitor connected to the positive terminal and the negative terminal of said voltage regulator.

20. The foam free system of claim 14 wherein the flow rate of said surrogate fluid through said multi-metering manifold valve is between about 2.8 GPM and 45 GPM, the flow rate of said surrogate fluid through said multi-metering manifold valve being set at approximately 45 GPM or 22.5 GPM when a user is testing a roof turret nozzle on said fire fighting vehicle, the flow rate of said surrogate fluid through said multi-metering manifold valve being set at approximately 9.0 GPM when a user is testing a bumper turret nozzle on said fire fighting vehicle, and the flow rate of said surrogate fluid through said multi-metering valve being set at approximately 2.8 GPM when the user is testing a left handline nozzle and a right handline nozzle on said fire fighting vehicle.

* * * * *